US009086896B2

(12) United States Patent
Smith et al.

(10) Patent No.: US 9,086,896 B2
(45) Date of Patent: Jul. 21, 2015

(54) TASKONOMIC CATEGORIZATION PALETTES

(75) Inventors: Jeffrey J. Smith, Raleigh, NC (US); David T. Windell, Raleigh, NC (US)

(73) Assignee: International Business Machines Corporation, Armonk, NY (US)

(*) Notice: Subject to any disclaimer, the term of this patent is extended or adjusted under 35 U.S.C. 154(b) by 2244 days.

(21) Appl. No.: 11/972,384

(22) Filed: Jan. 10, 2008

(65) Prior Publication Data

US 2009/0183113 A1 Jul. 16, 2009

(51) Int. Cl.
*G06F 3/048* (2013.01)
*G06F 9/44* (2006.01)

(52) U.S. Cl.
CPC ................. *G06F 9/4443* (2013.01)

(58) Field of Classification Search
CPC ........................................... G06F 3/048
USPC .......................................... 715/759
See application file for complete search history.

(56) References Cited

U.S. PATENT DOCUMENTS

| 6,756,999 B2 | 6/2004 | Stoakley et al. |
| 6,985,955 B2* | 1/2006 | Gullotta et al. ............... 709/229 |
| 2004/0193639 A1* | 9/2004 | Bergman et al. .......... 707/103 R |
| 2005/0010871 A1 | 1/2005 | Ruthfield et al. |
| 2007/0186176 A1 | 8/2007 | Godley |
| 2007/0208602 A1* | 9/2007 | Nocera et al. ..................... 705/8 |

OTHER PUBLICATIONS

S. Bonaduce, Beyond the Blue Finder, Hand-Off II Software Utility Program Review, Dec. 1992, 2 pages.
LINK4ADS.com, Multi-Launch, 2001, 1 page.
Wikipedia, AutoHotKey, Jan. 2008, 3 pages.
IBM Ease of Use, Real Places Design Guide, 1993, 42 pages.

* cited by examiner

*Primary Examiner* — Tadeese Hailu
*Assistant Examiner* — Darrin Hope
(74) *Attorney, Agent, or Firm* — Walter W. Duft

(57) ABSTRACT

A method, system and computer program product for supporting activity-centered, automated grouping of application and data resources, includes generating a user interface in a display device, presenting a set of application, data or hardware resources for user interaction in the user interface, defining an activity group associated with the resources in response to a user performing a consolidated user interface action, generating an interface control object in the graphical user interface representing the activity group, and invoking the resources associated with the activity group in response to user activation of the interface control object.

16 Claims, 10 Drawing Sheets

TASKONOMIC CATEGORIZATION PALETTES

1. FIELD OF THE INVENTION

The present invention is directed to computer desktop management. More particularly, the invention is concerned with the organization, categorization and display of computer-related resources.

2. DESCRIPTION OF THE PRIOR ART

By way of background, the modern worker is often bombarded with myriad types of information (e.g., documents, emails, instant messages, images, presentations, spreadsheets, etc.) from a variety of sources during the completion of a particular project/task. This same worker is often required to manage multiple projects, complete many different tasks, and is subject to a variety of interruptions. The ability to organize information is thus important to worker productivity.

Current computer desktop interfaces allow users to organize files within folders and subfolders in any desired manner. However, the ability to cross-reference documents in more than one folder can only be accomplished by creating copies or shortcuts. This is a manual technique that can only create static relationships between files. When the relationships change, the copies or shortcuts must be manually changed to reflect the new relationships. It is to improvements in the foregoing art that the present invention is directed.

SUMMARY OF THE INVENTION

An advance in the art is obtained by a method, system and computer program product for supporting activity-centered, automated grouping of resources. The disclosed technique includes generating a user interface in a display device, presenting a set of application, data or hardware resources for user interaction in the user interface, defining an activity group associated with the resources in response to a user performing a consolidated user interface action, generating an interface control object in the graphical user interface representing the activity group, and invoking the resources associated with the activity group in response to user activation of the interface control object.

In accordance with exemplary embodiments, the disclosed technique may additionally include generating a confirmation listing of resources to be added to the activity group, and removing unwanted resources from the activity group in response to user selection of entries in the confirmation listing. The disclosed technique may further include generating a recommendation listing of additional resources that can be added to the activity group, and adding resources to the activity group in response to user selection of entries in the recommendation listing. The disclosed technique may also include prompting a user to assign a name and password to the activity group. In some cases, the activity group may be automatically associated with resources that are not currently presented in the user interface but which are related to other resources associated with the activity group. The disclosed technique may further include managing the activity group by adding and removing user-specified resources in response to user activation of the activity group interface control object.

BRIEF DESCRIPTION OF THE DRAWINGS

The foregoing and other features and advantages of the invention will be apparent from the following more particular description of exemplary embodiments, as illustrated in the accompanying Drawings, in which.

DETAILED DESCRIPTION OF EXEMPLARY EMBODIMENTS

Figure 1:
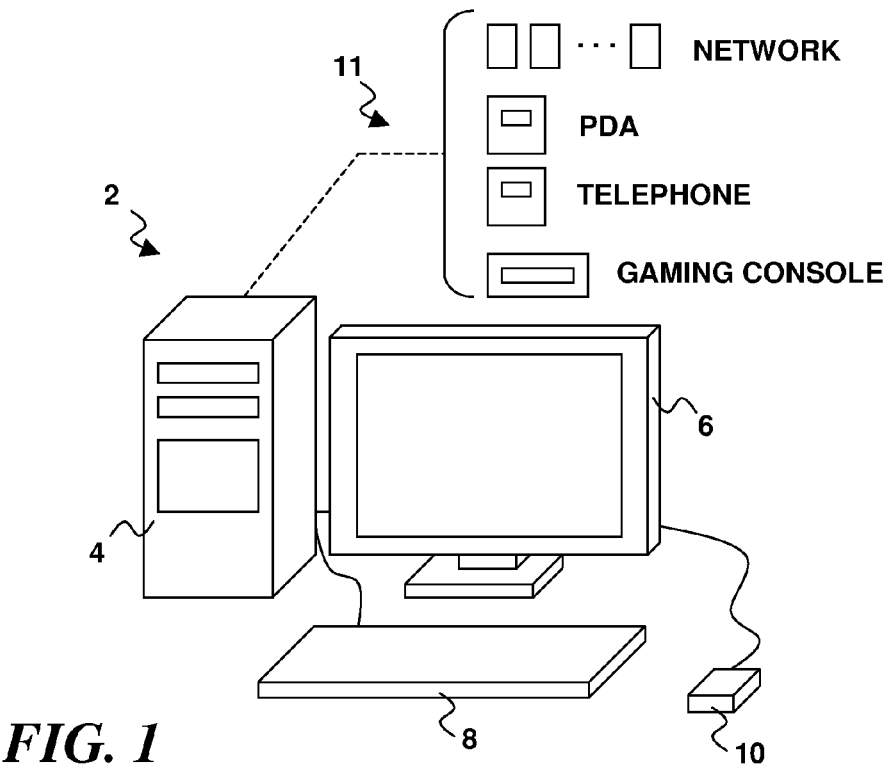
FIG. 1 is a diagrammatic illustration showing an exemplary data processing system that may be used to implement the disclosed activity-centered grouping technique.

Turning now to the drawing figures, wherein like reference numerals indicate like elements in all of the several views, FIG. 1 illustrates an exemplary data processing system 2 that may be implemented to support activity-centered grouping of application, data or hardware resources in accordance with the present disclosure. The system 2 includes an enclosure 4 containing system data processing components (see FIG. 2), a video display monitor 6 capable of generating an output of text and graphics images, a keyboard input device 8, and a mouse input device 10. The system 2 may be implemented using any of a variety of existing computers and other data processing systems and devices, including but not limited to mainframe and midrange computers, work stations, desktop computers, laptop computers, and handheld or portable devices such as personal digital assistants, mobile telephones, etc. The system 2 may be a standalone system or it may interact with external devices 11 that communicate with the system 2, such as other computing nodes in multi-node network, including a cluster or other scaled architecture. Other exemplary external devices that could communicate with the system 2 include, but are not limited to, mobile wireless telephones, land line telephone systems, personal digital assistants, gaming consoles, etc. Advantageously, the activity-centered grouping of resources as described herein can be coordinated between the system 2 and such external devices.

Figure 2:
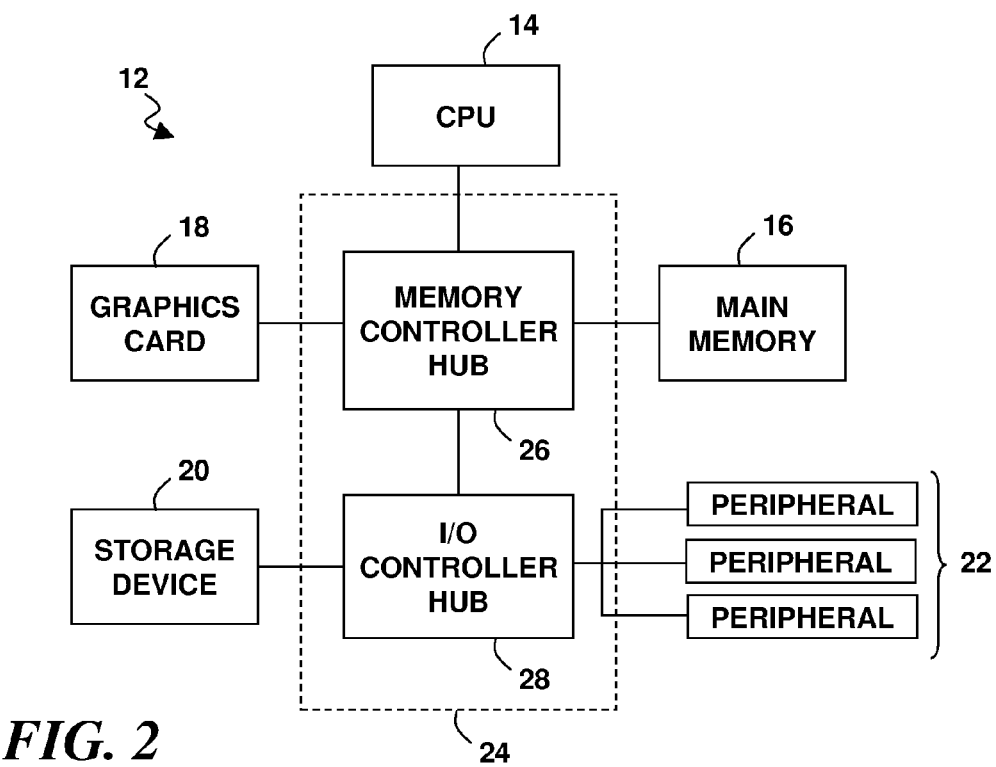
FIG. 2 is a functional block diagram showing exemplary data processing hardware components that may be used to implement the system of FIG. 1.

FIG. 2 illustrates exemplary hardware components 12 that may be contained within the enclosure 4 and used to implement the system 2 of FIG. 1. The components 12 may include one or more CPUs or other logic-implementing hardware 14 that operates in conjunction with a main memory 16 to provide a data processing core. Additional components may include a graphics card 18 (or a text display adapter) for generating visual output information to the display device 6 (graphics or text), a peripheral storage device 20, and various peripheral devices 22 that may include the keyboard 8 and the mouse 10 of FIG. 1. The peripheral devices 22 may also include other I/O resources, such as a USB bus controller, a SCSI disk controller, and a network adapter. A bus infrastructure 24 having a memory controller hub 26 and an I/O (input/output) controller hub 28 may be used to interconnect the foregoing elements. It should be understood that the components 12 are exemplary in nature and that other component arrangements may also be used to implement the system 2.

Figure 3:
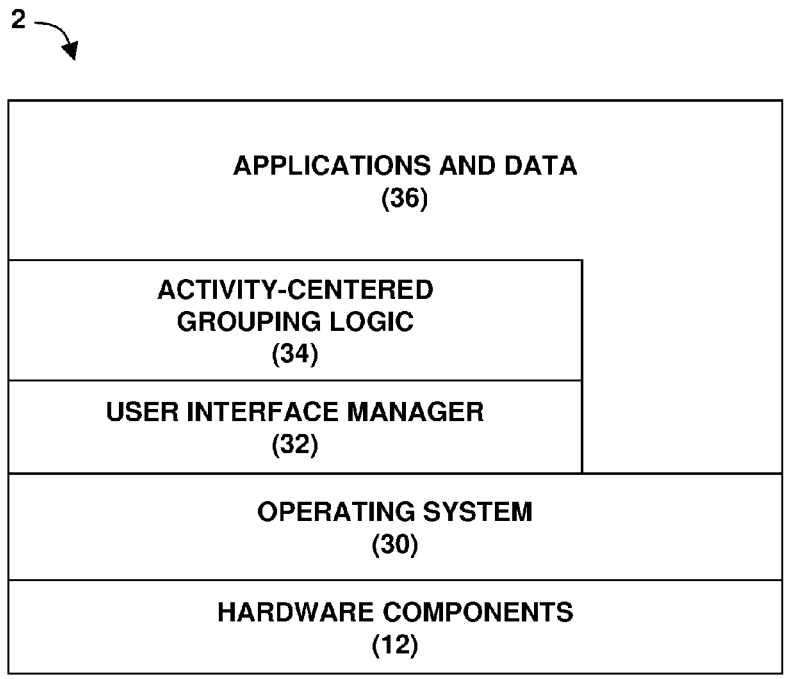
FIG. 3 is a functional block diagram showing exemplary logic of the system of FIG. 1.

Turning now to FIG. 3, various logic components for controlling the system 2 are shown. Reference numeral 30 represents an operating system that may be provided by any conventional operating system program capable of controlling the underlying hardware, including but not limited to general purpose operating systems, embedded operating systems, guest operating systems running in a virtual machine, virtual machine managers, hypervisors, etc. Preferably, the operating system 30 supports the generation of a graphical user interface on the display device 6. However, this is not a requirement insofar as activity-centered grouping of application, data or hardware resources as disclosed herein may be implemented in either a graphical (e.g. windowed) environment or a text-only environment (e.g., using text-based grouping commands).

A user interface manager 32 manages the display of user interface information on the display device 6. This logic may be implemented using a conventional text-based system or a windowing system in which application display output is presented in one or windows that can be manipulated using graphical controls such as icons and other display objects. Conventional windowing systems include the X Windows system designed for Unix® or Unix-like operating systems and the windowing system provided with the Microsoft® Windows® operating system. The user interface manager 32 includes the core windowing system logic that interfaces with the operating system level device driver (not shown) for the graphics card 18 (FIG. 2). This core logic also processes input events from the keyboard 8 and the mouse 10, and updates the display device 6. The user interface manager 32 may also include one or more libraries for creating graphical objects, and a window manager that controls the appearance of windows presented on the display device 6 and the manner in which users interact with them. The Microsoft® Windows® operating system includes an integrated window manager. Exemplary Unix-style window managers include WindowMaker, IceWM, FVWM, AfterStep, Enlightenment, Sawfish and Kwm, to name but a few. The user interface manager 32 in a Unix-style environment may further include higher-level control logic known as a desktop environment, such as the Gnome or KDE desktop environments. Such desktop environments operate with a window manager and provide additional functionality such as a file manager and one or more themes, programs and libraries for managing the desktop.

The logic components of FIG. 3 further include activity-centered grouping logic 34 that supports the grouping and management of application, data or hardware resources based on activities, such as work projects. The grouping logic 34 may operate in conjunction with the user interface manager 32, and can be invoked by users who run applications, utilize data and access hardware that is either internal or external to the system 2. As described in more detail below, the grouping logic 34 provides user interface control objects that users may invoke to group resources based on a task or activity (or in any desired manner), and thereafter manage the resources as a group. This logic may be implemented as a set of program instructions that are loaded into the memory 16 and executed by the CPU 14 of FIG. 2. Alternatively, the grouping logic 34 could be implemented as firmware or hardware, or as a combination of software, firmware and/or hardware logic. Application and data resources that may be managed by the grouping logic 34 are collectively shown by reference numeral 36 in FIG. 3. These resources may be internal to the system 2 or they may reside one or more of the external devices 11 that communicate with the system 2, such as any of the portable devices listed above (e.g., network nodes, telephones, personal digital assistants, gaming consoles, etc.). Hardware resources that may be managed by the grouping logic could include one or more of the hardware components 12 of FIGS. 2 and 3. The hardware resources could additionally be located on one or more of the external devices 11 that communicate with the system 2 (e.g., as per the exemplary items enumerated above).

Figure 4:
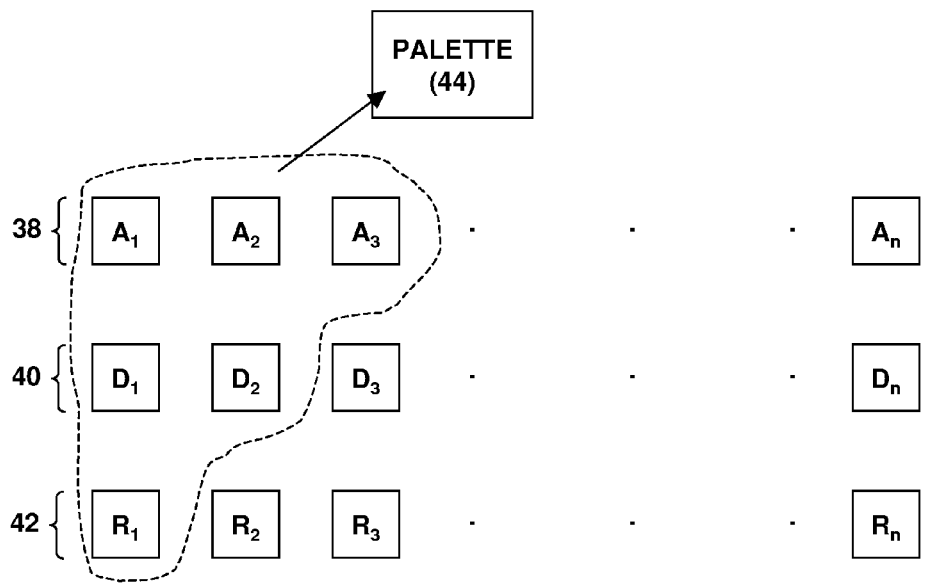
FIG. 4 is a functional block diagram showing exemplary grouping of application, data and hardware resources.

FIG. 4 provides another view of the resources that may be managed by the grouping logic 34. In particular, FIG. 4 illustrates a collection of applications 38 (labeled $A_1$-$A_n$), data 40 (labeled $D_1$-$D_n$) and hardware 42 (labeled $H_1$-$H_n$) that operate on the system 2 or which are managed by one or more of the external devices 11. The grouping logic 34 of FIG. 3 allows users to group selected applications, data and hardware components in association with a logical grouping entity 44 that may be referred to as an "organizational palette" or simply "palette." The palette 44 represents an activity group that encompasses the selected resources. This activity-centered grouping of resources may be referred to as "taskonomic" categorization because it groups items of interest by task or activity. Examples include tasks or activities associated with a particular work project, work (user) group or other organization, individual user, etc.

The palette 44 may be implemented as a file directory or other repository that maintains persistent identifications of the palette contents that comprise the activity group. Alternatively, the palette 44 could be implemented as a script or other program that activates and controls the resources associated with the palette. The palette contents can be files that define the resources belonging to the group. The palette contents may also be implemented as logical links to resource files, such as symbolic links in Unix® or Unix-like systems and shortcuts in Microsoft® Windows® systems. One advantage of using logical links instead of actual files is that the links will always be synchronized with the underlying file whenever file edits are made, and visa versa. If the palette 44 is implemented as a directory containing such logical links, changes to a file within that palette will update the file across other palettes and synchronize the changes throughout the system 2. If the files are associated with applications, data or hardware resources located on one or more of the external devices 11, editing the logical links associated with the palette 44 also provides a multi-device synchronization mechanism. On the other hand, there may be cases where a palette 44 should contain its own unique version of a file, in which case logical links would not be appropriate.

Almost any type of application, data or hardware resource may be associated with the palette 44. Examples of application resources that may be represented in the palette 44 include, but are not limited to, email programs, contact managers, calendar programs, communications and telephony programs, word processors, presentation programs, spreadsheet programs, database management programs, messaging programs, graphics presentation programs and editors, multimedia players and editors, web browsers, sticky note software, etc. Examples of data resources that may be represented in the palette include, but are not limited to, email messages, contacts or contact lists, calendar items such as to-do lists, upcoming meetings and calls, etc., communications and telephony data, documents, presentations, spreadsheets, databases, messages and message sessions, graphics images, multimedia works, web pages, sticky notes, etc. Examples of hardware resources that may be represented in the palette 44 include, but are not limited to, network devices, personal digital assistant devices, telephony and other communications devices, gaming consoles, etc. Conventional operating systems maintain device files for such devices, and logical links to such files (or the files themselves) can be added to the palette 44 so that the palette may be used for device control, management and administration.

Figure 5:
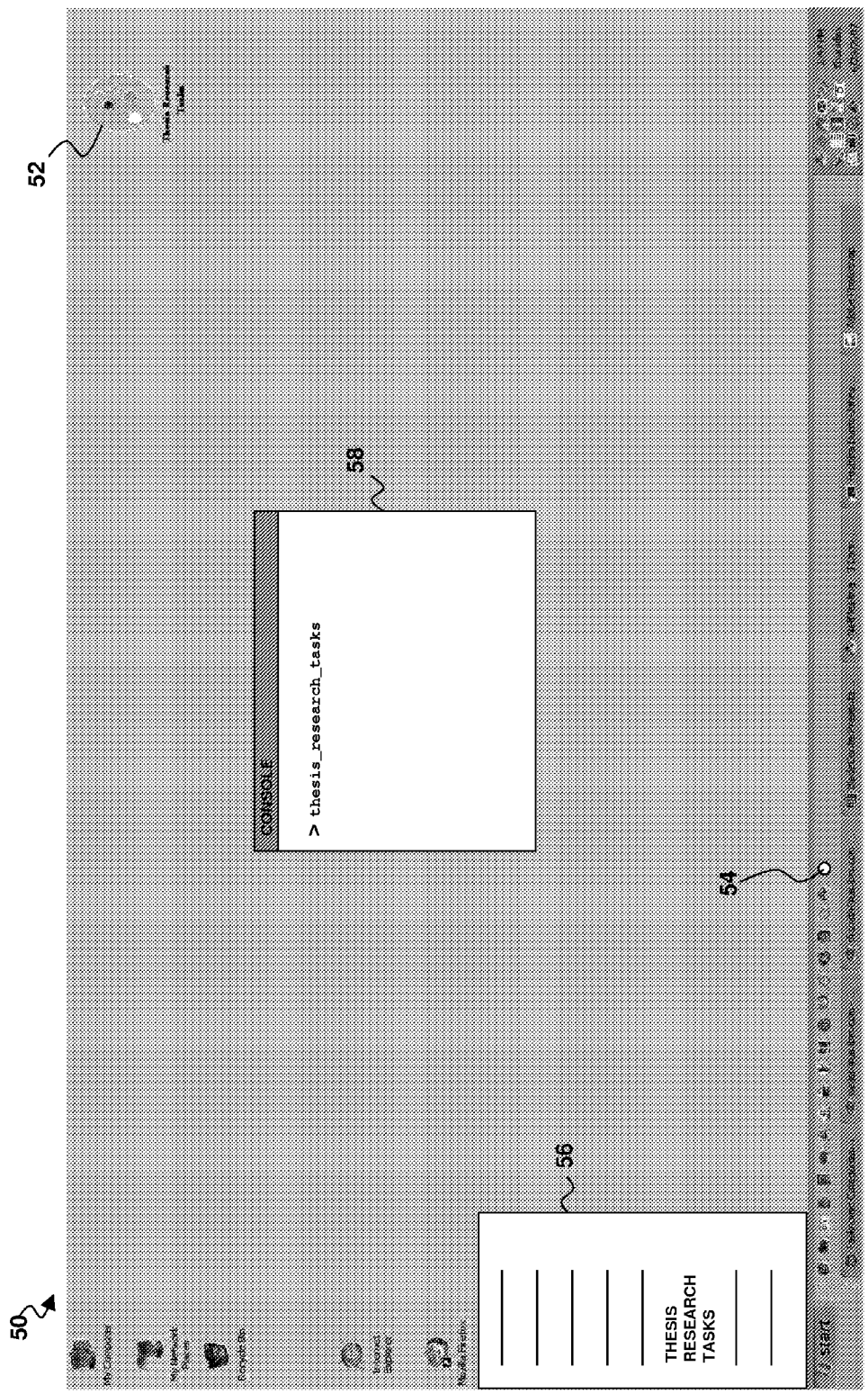
FIG. 5 is a diagrammatic representation of a desktop user interface showing an exemplary grouping object and exemplary interfaces thereto.

All items relating to the palette 44 are accessible through a user interface control object that may be referred to as a "taskonomic categorization palette object" (hereinafter referred to as a "palette object"). The palette object may be presented in a variety of ways for user interaction. Four examples are shown in FIG. 5, which illustrates an exemplary desktop graphical user interface 50 (desktop interface) generated by the interface manager 32 of FIG. 3 on the display device 6 of FIG. 1. A first exemplary palette object 52 is implemented as a desktop icon on the desktop interface 50. This icon is labeled "Thesis Research Tasks," which represents an exemplary name assigned to the palette 44. A second exemplary palette object 54 is implemented as a tray icon on the desktop interface 50. A third exemplary palette object 56 is implemented as a start menu program item on the desktop interface 50. A fourth exemplary palette object 58 is implemented as a console that receives text-based console commands. Other palette object types could not doubt also be used.

Figure 6:
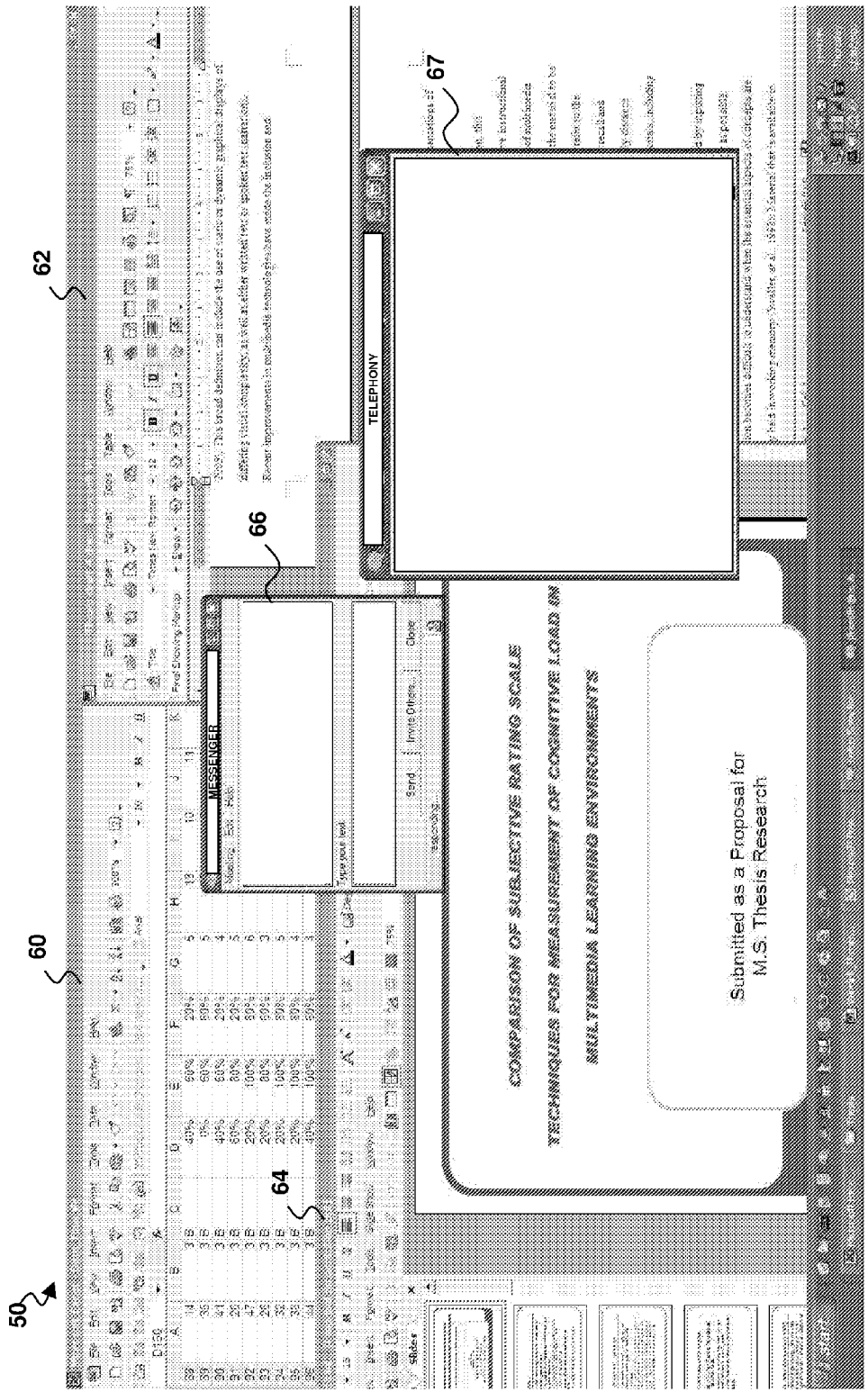
FIG. 6 is a diagrammatic representation of the desktop user interface of FIG. 5 in which exemplary resources are presented for user interaction in user interface windows.

Interfaces to the palette 44 can be provided by associating standard desktop folder manipulation actions with the palette objects 52-58. Invocation of any of the palette objects 52-58 in a predetermined manner (e.g., right-clicking palette objects 52-56 or typing the palette name (e.g., "thesis_research_tasks") in the console palette object 58) results in a desired action taking place. One exemplary action is to launch the contents of the palette 44 and present them on the desktop interface 50 for user interaction within conventional windows or other user interface objects (e.g., minimized window icons, etc.). A keyboard command sequence, such as a chorded key press, could also be used to launch and display the palette contents, as could a combination of keyboard and mouse actions. The result of this "palette launch" action is illustrated in FIG. 6, in which exemplary contents of the palette 44 have been opened and presented for use in corresponding display windows. The open palette items include a spread sheet 60, a word processing document 62, a presentation 64, a messaging session 66, and a telephony or other voice communication application 67. Thus, with a single action, the user can invoke the contents of the palette 44 and commence or continue an activity that involves user interaction with the resources associated with the palette 44. It will be seen that each of palette items 60-66 represents data that is launched by way of a standard application. In this case, it will be appreciated that only the data files, or logical links thereto, need to be associated with the palette 44. By virtue of the conventional file association logic provided by modern operating systems, the appropriate applications for the data files will be invoked whenever the palette launch action is performed. In other cases, it may be desirable to open a commonly-used application without any associated data being invoked, such as the voice communication application 67. In this situation, the application itself (or a logical link thereto) could be associated with the palette 44. By performing the single palette launch action, only the application would be launched, such as a word processor with a blank document or a telephony application that initiates a VoIP telephony connection or a messaging voice function. As previously stated, the palette 44 may also contain hardware device files (or logical links thereto). In that case, performing the single palette launch action could result in an interface associated with the device being displayed. For example, a storage device such as a USB memory stick, a network storage device, etc. could be mounted into the file system and a folder window opened to display the file contents. Another example would be a telephone system connected to the system 2, in which case invoking the single palette launch action could result in the telephone being activated. Still another example would be a network data processing peer that communicates with the system 2. In that case, invocation of the single palette launch action could result in communication being established with the peer and possibly a network administration interface being invoked to control the peer. This could be useful for network-wide software installation and other administrative tasks.

Figure 7:
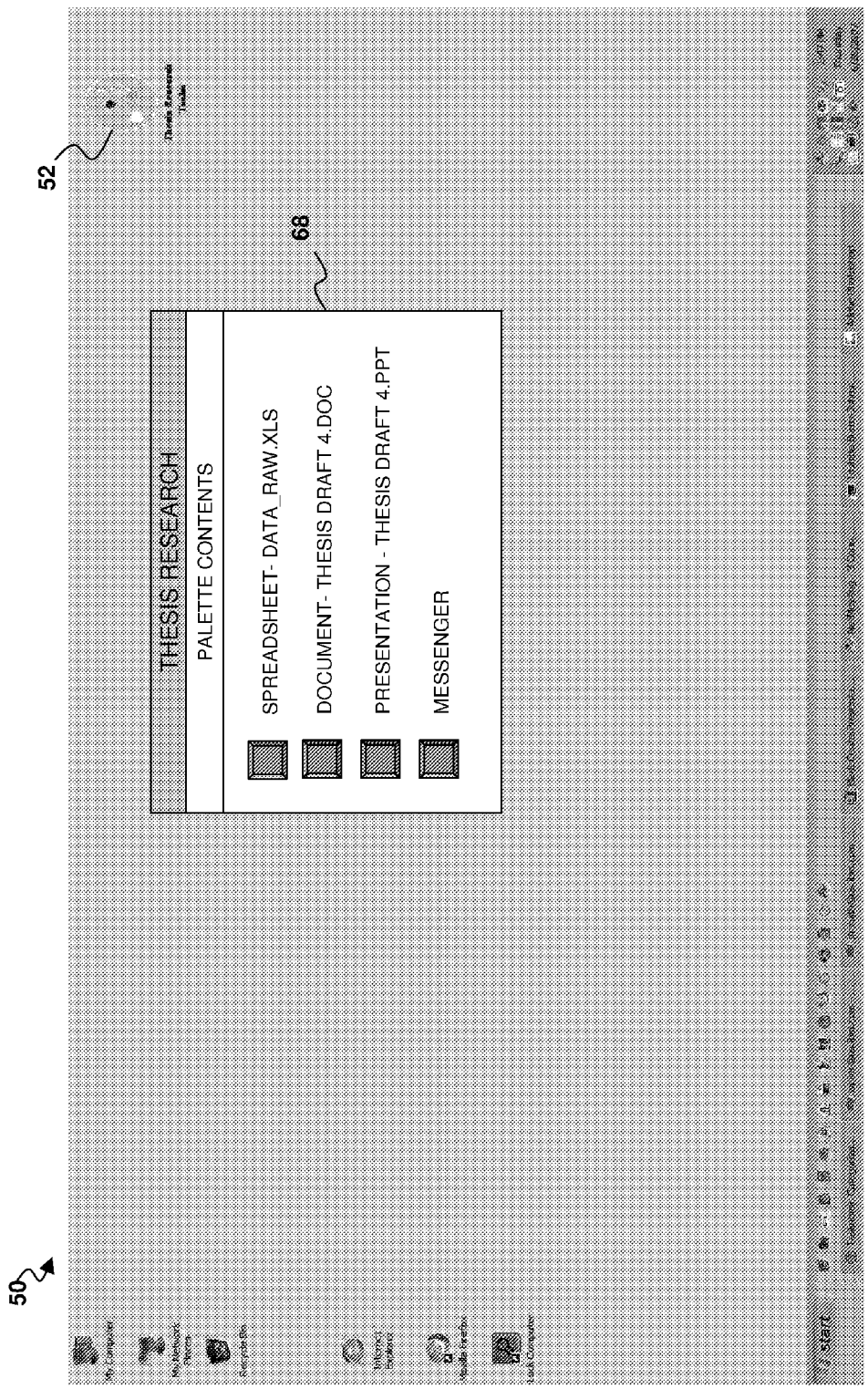
FIG. 7 is a diagrammatic representation of the desktop user interface of FIG. 5 showing an exemplary grouping object and a further exemplary interface thereto.

Another action that may be associated with the palette objects 52-58 is a "palette management" operation. FIG. 7 illustrates an example of this action in which the contents of the palette are listed in a window 68 instead of being launched. A palette management operation, such as launching one or more palette items individually, removing a palette item, duplicating a palette item, etc. may then be performed using an appropriate interface action associated with the window 68. Exemplary actions include, but are not limited to, left clicking a palette item to launch it, right clicking a palette item to delete or duplicate it, dragging a palette item out of the window 68 and dropping on another palette object (not shown) to move the item from the palette 44 to some other palette, or dragging an item from the desktop interface 50 or from another palette in order to add it to the palette 44. Thus, users may selectively add/remove palette items with respect to any existing palette.

Figure 8:
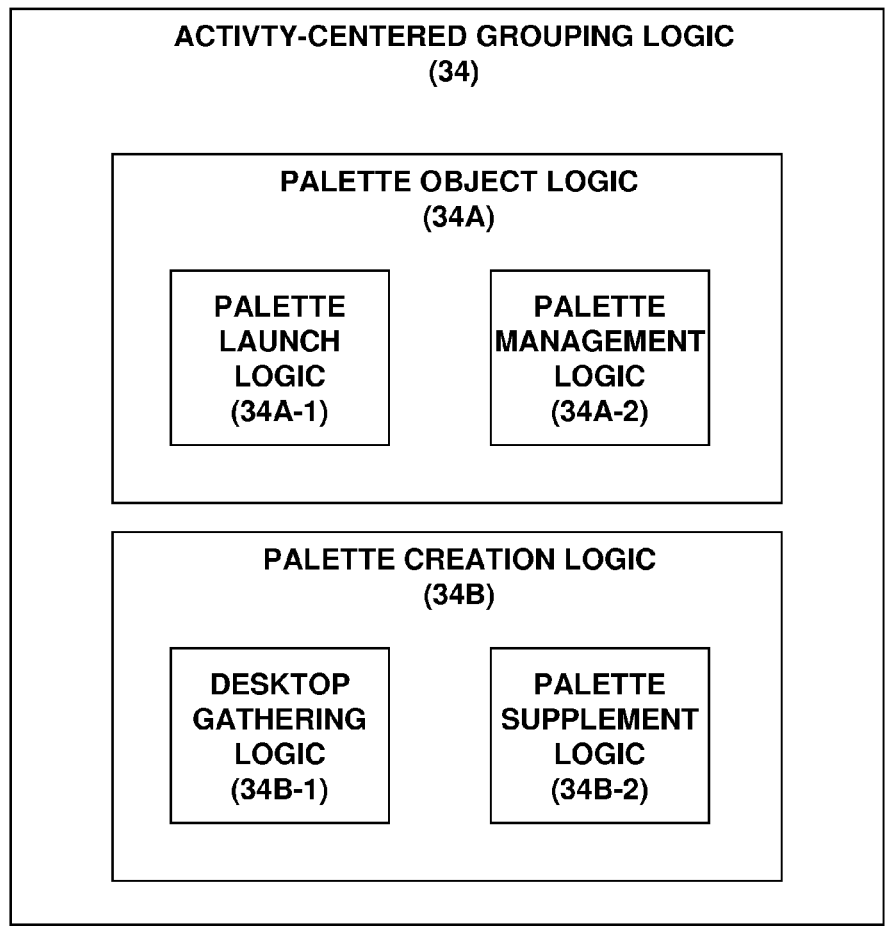
FIG. 8 is a block diagram showing exemplary grouping logic.
Figure 9:
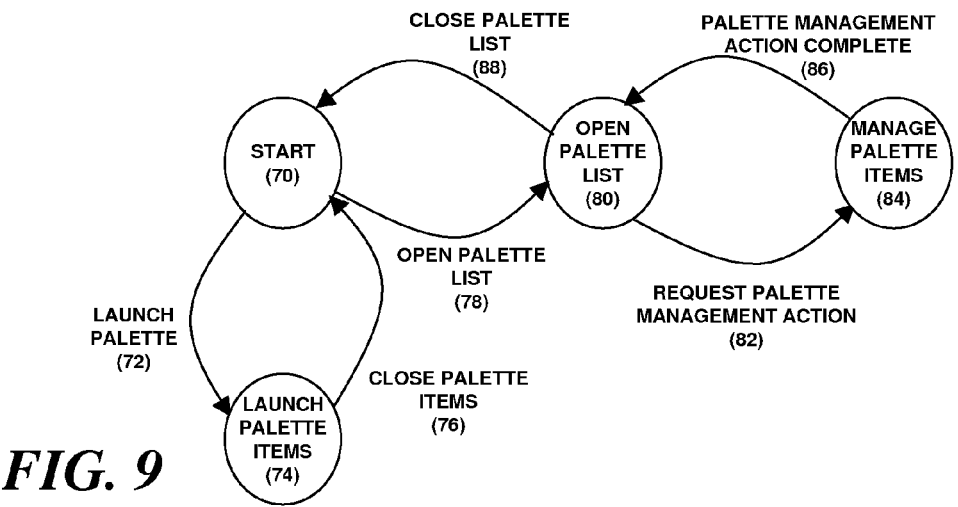
FIG. 9 is a state diagram showing exemplary activity group invocation and management logic.

Turning now to FIG. 8, the foregoing palette launch and palette management methods associated with the palette objects 52-58 (or any other desired methods) may be implemented by palette object logic 34A, which is part of the grouping logic 34 of FIG. 3. The palette object logic 34A includes palette launch logic 34A-1 that implements the above-described palette launch action. The palette object 34A further includes palette management logic 34A-2 that implements the above-described palette management action. FIG. 9 is a state diagram that shows exemplary operations of the logic 34A-1 and 34A-2. State 70 represents a start condition in which the palette object logic 34A is quiescent. Action 72 represents invocation of the palette launch action. State 74 represents the desktop state after the palette items have been launched, as shown in FIG. 6. Action 76 represents a user closing the palette items and a return to state 70. Action 78 represents a user opening the palette's item list, and state 80 represents the palette list being displayed, as shown in window 68 of FIG. 7. Action 82 represents the user requesting a palette management action, and state 84 represents the operation being implemented. Action 86 represents completion of the palette management operation and a return to state 80.

Action 88 represents the palette item display (window 68 of FIG. 7) being closed and a return to state 70. Conventional programming tools may be used to implement the palette object logic, including but not limited to object oriented tools for creating user interface objects and associated methods that are invoked when the objects are selected.

Figure 10:
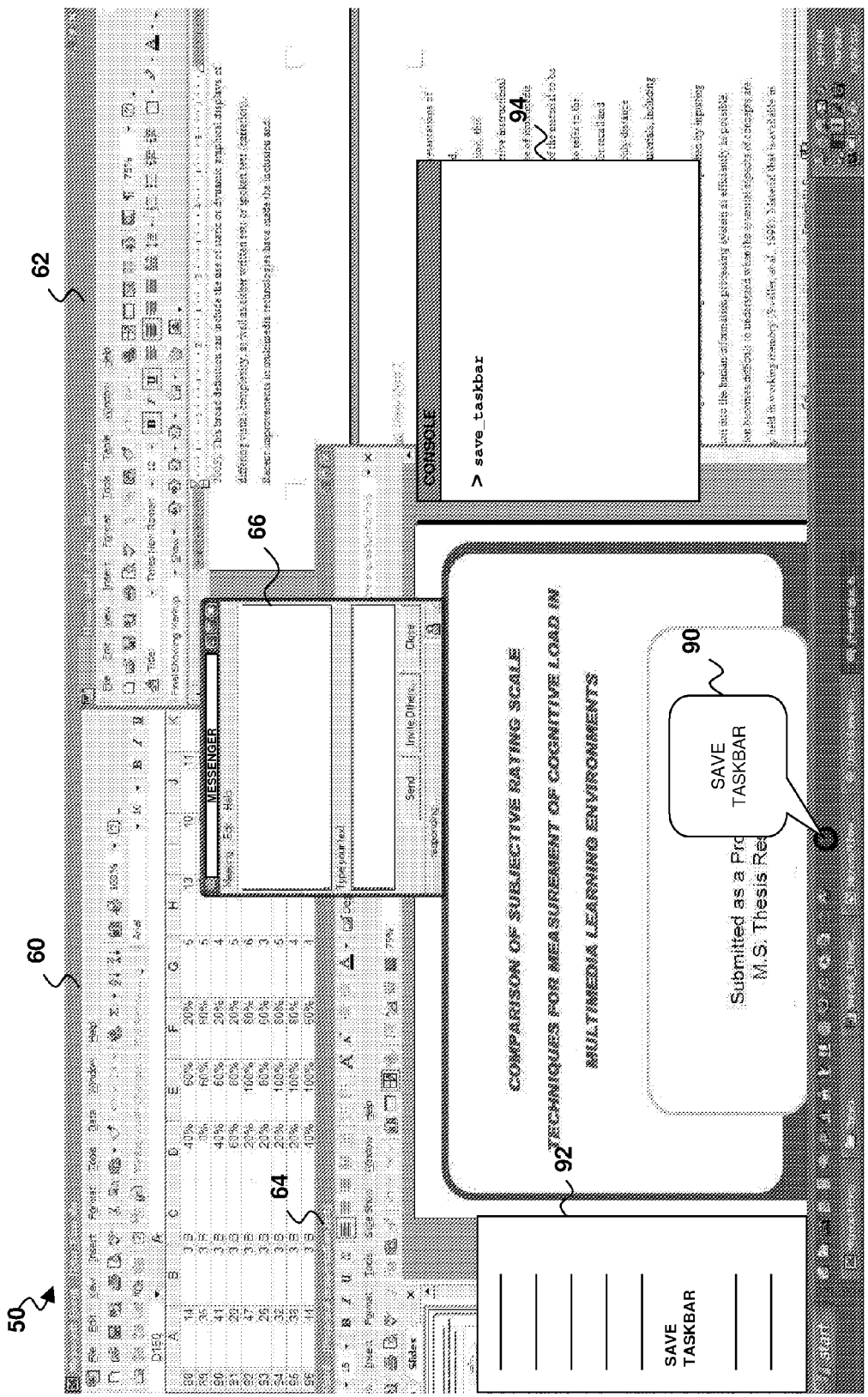
FIG. 10 is a diagrammatic representation of the desktop user interface of FIG. 5 showing exemplary activity group creation control objects.

Returning now to FIG. 8, the grouping logic 34 further includes palette creation logic 34B for creating the palette 44. The palette creation logic 34B may include desktop gathering logic 34B-1 that allows a user to create a new palette based on windows (or other objects) that are open on a desktop (including minimized windows). One or more interface control objects ("palette creation objects) may be provided so that a user may activate the desktop gathering logic 34B-1 by performing a consolidated action (e.g., a mouse operation, entry of a console command or other keyboard key press operation, a chorded mouse-keyboard operation, etc.). One such palette creation object is shown by reference numeral 90 in FIG. 10. The palette creation object 90 is a desktop icon that may be located in a menu bar on the desktop interface 50. This object can be identified to the user as a "save taskbar" option to signify that the user can save all (or a subset of) of the open windows to a palette in order to be opened later (when revisiting the task or working on a similar task). The object 90 may be activated by a left button mouse click or the like that activates the desktop gathering logic 34B-1 to gather all open windows on desktop interface 50 and create a new palette containing the underlying resources associated with those windows. Conventional user interface control resources such as task bar lists, window lists, and the like may be consulted by the desktop gathering logic 34B-1 in order to identify the open windows and their underlying resources. Reference numerals 92 and 94 represent exemplary alternative palette creation objects. Palette creation object 92 is implemented as a start menu program item on the desktop interface 50 that is activated by a left button mouse click, a keyboard "enter" key press, or the like. Palette creation object 94 is implemented as a console that receives typed console commands including a "save_taskbar" command (the command name being arbitrary) that invokes the desktop gathering logic 34B-1. A further option would be to provide a keyboard and/or mouse command sequence, such as a chorded key press or a combination of keyboard and mouse actions to activate the desktop gathering logic 34B-1. Other palette creation object types could no doubt also be used.

Figure 11:
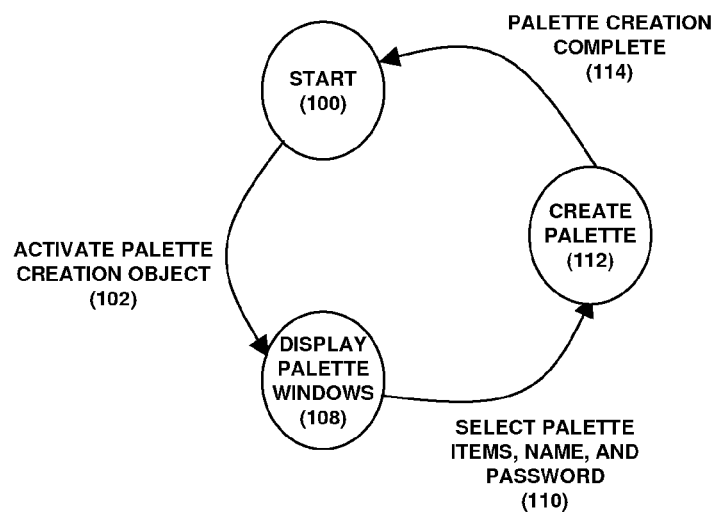
FIG. 11 is a state diagram showing exemplary activity group creation logic.
Figure 12:
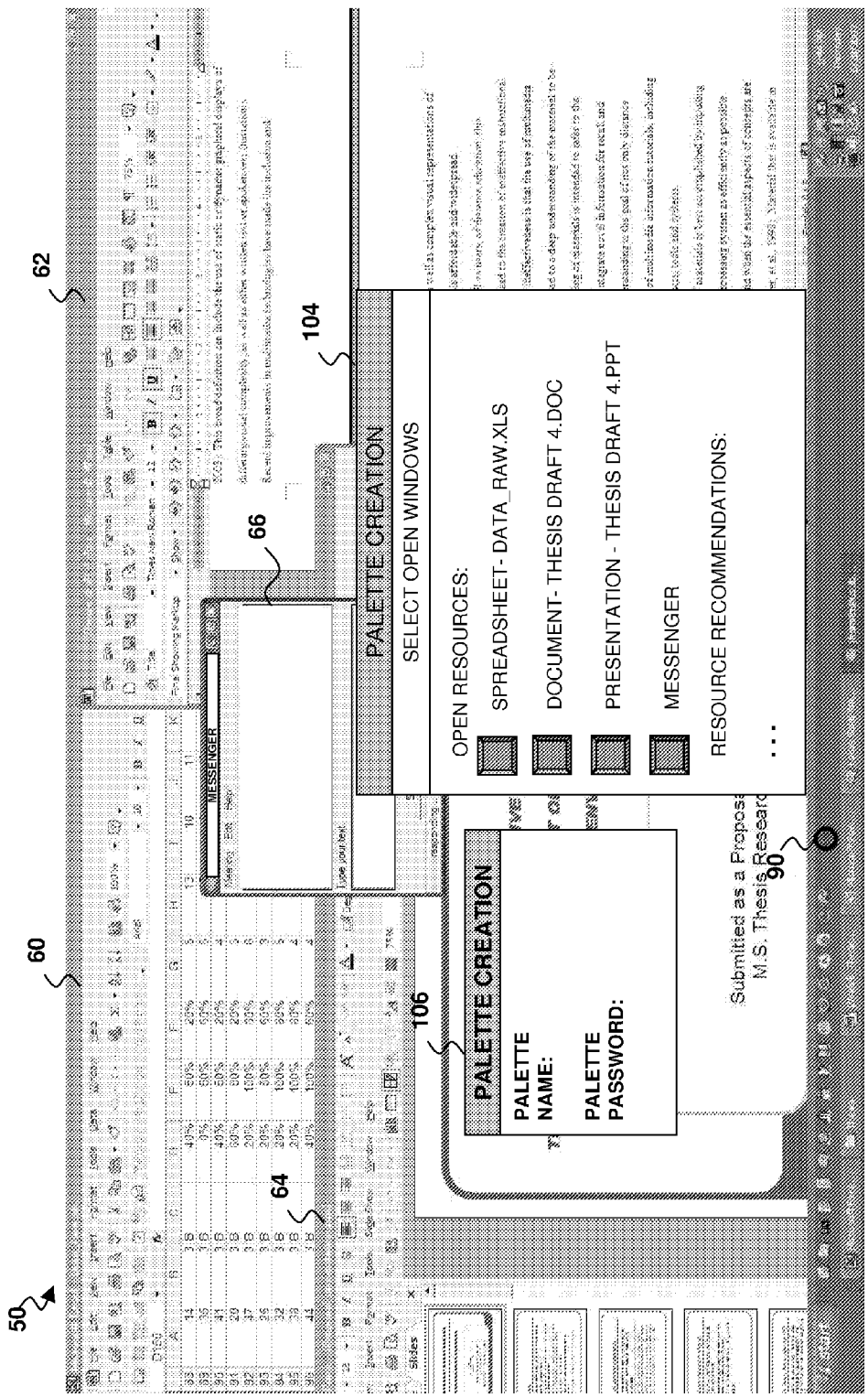
FIG. 12 is a diagrammatic representation of the desktop user interface of FIG. 5 showing additional exemplary activity group creation control objects.

The desktop gathering logic 34B-1 may be implemented to allow a user to create a new palette and an associated palette object in the manner shown in FIG. 11. State 100 represents the desktop gathering logic 34B-1 in a quiescent state. Action 102 represents a user activating the palette creation object 90 (or 92-94) or performing some other consolidated action to invoke the logic 34B-1. This action may result in the display of one or more palette creation dialog windows, such as the windows 104 and 106 of FIG. 12. Although not shown, a set of multilevel dialog windows could also be generated, depending on the palette creation options to be provided (see below). The palette creation window 104 contains a confirmation listing of all resources associated with open windows (open-window resources) that may be added to the new palette, together with selection boxes that allow the user to deselect items that should not be added to the palette. As shown in FIG. 12, the window 104 could optionally include a listing of resource recommendations (recommendation listing) made by the palette creation logic 34B that are not currently associated with open windows but which are related to the open-window resources in some way. For example, the window 104 could list files that a user had opened at the same time as a currently open file, but which was previously closed. The window 104 could also list files from or to which information in a currently open file had been cut and pasted. A further option would be to display all data files that were recently accessed within some specified period of time (e.g., the last hour, day, etc.), thus allowing an open window history to be used for palette creation. In each of the foregoing cases, the palette creation logic 34B would be implemented to maintain a history of user interface activity over a defined time window. A still further option would be to present users with the ability to specify file types to be added. A still further option would be to allow users to search for and select palette items, including resources that may not be presently displayed in open windows or which may not have individual window-based controls, such as stickynotes, emails, contacts, etc. According to a still further option, users could be allowed to specify default options for subsequent palette creation operations. For example, the user could permanently activate the cut-and-paste option, select a length of time for the window history option, specify file types to be added, etc.

The palette creation window 106 is a dialog window that allows the user to enter a name for the palette and optionally assign a palette password. This password can be used to restrict access to the palette via the palette objects 52-58 of FIG. 5. In addition, the palette password could be used to restrict access to individual palette items via other means, such as accessing an item through the file system. State 108 of FIG. 11 represents the display of the palette creation windows 104 and 106. Action 110 represents the user selection of palette items, a palette name and an optional palette password using the windows 104 and 106. State 112 represents the creation of the palette 44, together with one or more of the palette objects 52-58. Action 114 represents the completion of palette creation and a return to state 100.

If desired, the palette creation logic 34B could implement alternative item-based palette creation logic 34B-2. This logic would allow a user to create an empty palette (with or without a password) together with one or more palette objects, and manually search for and add palette items thereto. For example, the manual addition of palette items could be handled by dragging and dropping desktop items onto one of the palette objects 52-56 of FIG. 5 or by typing an appropriate palette supplementation command in the console palette object 58 (e.g., naming the palette and the item to be added). A further alternative would be to implement the user interface manager 32 of FIG. 3 so that it adds a palette supplementation option to standard control objects (windows, icons, etc.) associated with applications, data and hardware. For example, a user could right click on a document icon and a menu would allow the user to select a palette (or create a new palette) and add the document to that palette.

It will be appreciated that the above-described activity-centered grouping technique offers a number of advantages. These advantages include:
1) consolidating and organizing all relevant application, data and hardware resources into a single location;
2) launching all resources associated with a palette using a single action;
3) extending the desktop metaphor to current technologies, such as external device control;
4) improving file/folder systems by arranging documents by functional 'taskonomy' rather than taxonomies arranged for different purposes;
5) allowing users to rollover resources into new projects;
6) aiding information organization for efficient reporting by project/week/etc.; and 7) assisting users in quickly manipulating information on a portable devices, kiosks, network peers, etc.

Accordingly, a technique has been disclosed that allows relationships between resources to be captured automatically, subject to user control, and dynamically updated and synchronized in response to changes to the underlying resources or their interrelationships. It will be appreciated that the foregoing concepts may be variously embodied in any of a data processing system, a machine implemented method, and a computer program product in which programming logic is provided by one or more machine-useable media for use in controlling a data processing system to perform the required functions.

Figure 13:
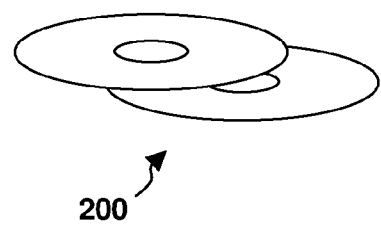
FIG. 13 is a diagrammatic representation of exemplary storage media that may be used in a computer program product implementation of logic that may be used to implement of the disclosed activity-centered grouping technique.

Relative to a computer program product having a machine-readable media and programming logic, exemplary data storage media for storing the programming logic are shown by reference numeral 200 in FIG. 13. The media 200 are shown as being portable optical storage disks of the type that are conventionally used for commercial software sales, such as compact disk-read only memory (CD-ROM) disks, compact disk-read/write (CD-R/W) disks, and digital versatile disks (DVDs). Such media can store the grouping logic 34 of the FIG. 3, either alone or in conjunction with another software product that incorporates the required functionality (such as an operating system). The foregoing logic and data could also be provided by portable magnetic media (such as floppy disks, flash memory sticks, etc.), or magnetic media combined with drive systems (e.g. disk drives), or media incorporated in data processing platforms, such as random access memory (RAM), read-only memory (ROM) or other semiconductor or solid state memory. More broadly, the media could comprise any electronic, magnetic, optical, electromagnetic, infrared, semiconductor system or apparatus or device, transmission or propagation signal or medium (such as a network), or other entity that can contain, store, communicate, propagate or transport the programming logic for use by or in connection with a data processing system, computer or other instruction execution system, apparatus or device. It will also be appreciated that the invention may be embodied in a combination of hardware logic and software elements, and that the software elements may include but are not limited to firmware, resident software, microcode, etc.

While various embodiments of the invention have been described, it should be apparent that many variations and alternative embodiments could be implemented in accordance with the invention. It is understood, therefore, that the invention is not to be in any way limited except in accordance with the spirit of the appended claims and their equivalents.

What is claimed is:

1. A machine-implemented method for supporting activity-centered grouping of resources, comprising:
    generating a user interface in a display device;
    presenting a set of application, data or hardware resources for user interaction in one or more open windows in said user interface;
    defining an activity group associated with said resources in response to a user performing a consolidated user interface action that captures said resources into said activity group as activity group resources;
    in response to said defining an activity group, generating an interface control object in said user interface representing said activity group;
    invoking one or more of said activity group resources in response to user activation of said interface control object so that said one or more activity group resources are presented for user interaction in said user interface; and
    managing said activity group by adding and removing user specified resources in response to user activation of said interface control object.

2. A method in accordance with claim 1, further including generating a confirmation listing of resources to be added to said activity group, and removing unwanted resources from said activity group in response to user selection of entries in said confirmation listing.

3. A method in accordance with claim 1, further including generating a recommendation listing of additional resources that can be added to said activity group, and adding resources to said activity group in response to user selection of entries in said recommendation listing.

4. A method in accordance claim 1, further including prompting a user to assign a name and password to said activity group.

5. A method in accordance with claim 1, wherein said activity group is further associated with resources that are not currently presented in said user interface but which are related to other resources associated with said activity group.

6. A system for supporting activity-centered grouping of application and data resources, comprising:
    a processor;
    a memory coupled to said processor, said memory comprising a computer useable medium tangibly embodying at least one program of instructions executable by said processor to perform operations comprising:
    generating a user interface in a display device;
    presenting a set of application, data or hardware resources for user interaction in one or more open windows in said user interface;
    defining an activity group associated with said resources in response to a user performing a consolidated user interface action that captures said resources into said activity group as activity group resources;
    in response to said defining an activity group, generating an interface control object in said user interface representing said activity group;
    invoking one or more of said activity group resources in response to user activation of said interface control object so that said one or more activity group resources are presented for user interaction in said user interface; and
    managing said activity group by adding and removing user specified resources in response to user activation of said interface control object.

7. A system in accordance with claim 6, wherein said processor operations further include generating a confirmation listing of resources to be added to said activity group, and removing unwanted resources from said activity group in response to user selection of entries in said confirmation listing.

8. A system in accordance with claim 6, wherein said processor operations further include generating a recommendation listing of additional resources that can be added to said activity group, and adding resources to said activity group in response to user selection of entries in said recommendation listing.

9. A system in accordance claim 6, wherein said processor operations further include generating a dialog window that prompts a user to assign a name and password to said activity group.

10. A system in accordance with claim 6, wherein said activity group is further associated with resources that are not currently presented in said user interface but which are related to other resources associated with said activity group.

11. A computer program product, comprising:
one or more non-transitory computer useable media;
programming logic associated with said computer useable media to program a data processing platform to support activity-centered grouping of application and data resources, as by:
generating a user interface in a display device;
presenting a set of application, data or hardware resources for user interaction in one or more open windows in said user interface;
defining an activity group associated with said resources in response to a user performing a consolidated user interface action that captures said resources into said activity group as activity group resources;
in response to said defining an activity group, generating an interface control object in said user interface representing said activity group;
invoking one or more of said activity group resources in response to user activation of said user interface control object so that said one or more activity group resources are presented for user interaction in said user interface; and
managing said activity group by adding and removing user specified resources in response to user activation of said interface control object.

12. A computer program product in accordance with claim 11, wherein said programming logic is further adapted to program a data processing platform to generate a confirmation listing of resources to be added to said activity group, and remove unwanted resources from said activity group in response to user selection of entries in said confirmation listing.

13. A computer program product in accordance with claim 11, wherein said programming logic is further adapted to program a data processing platform to generate a recommendation listing of additional resources that can be added to said activity group, and add resources to said activity group in response to user selection of entries in said recommendation listing.

14. A computer program product in accordance with claim 11, wherein said programming logic is further adapted to program a data processing platform to prompt a user to assign a name and password to said activity group.

15. A computer program product in accordance with claim 11, wherein said activity group is further associated with resources that are not currently presented in said user interface but which are related to other resources associated with said activity group.

16. A computer program product, comprising:
one or more non-transitory computer useable media;
programming logic associated with said computer useable media to program a data processing platform to support activity-centered grouping of application and data resources, as by:
generating a user interface on a display device;
defining an activity group associated with resources currently being presented in one or more open windows in said user interface in response to user invocation of a first interface control object, a text command, a keyboard action, a mouse action, or a coordinated mouse-keyboard action in said user interface that captures said resources into said activity group as activity group resources;
in response to said defining an activity group, generating a second interface control object in said user interface representing said activity group;
invoking all of said activity group resources associated with said activity group in response to user activation of said second interface control object so that all of said activity group resources are presented for user interaction in said user interface;
said resources comprising one or more local or external application resources, data resources and hardware resources, including telephony applications or devices;
said resources being associated with said activity group by way of logical links to said resources;
said activity group being further associated with resources that are not currently presented in said interface but which are related to other resources associated with said activity group;
said programming logic being further adapted to program a data processing platform to generate a confirmation listing in said user interface of resources to be added to said activity group, and remove unwanted resources from said activity group in response to user selection of entries in said confirmation listing;
said programming logic being further adapted to program a data processing platform to generate a recommendation listing in said graphical user interface display of additional resources that can be added to said activity group, and add resources to said activity group in response to user selection of entries in said recommendation listing;
said programming logic being further adapted to program a data processing platform to generate a dialog window that prompts a user to assign a name and password to said activity group; and
said programming logic being further adapted to program a data processing platform to allow a user to manage said activity group by adding and removing resources.

* * * * *